(12) United States Patent
Le et al.

(10) Patent No.: US 6,429,994 B1
(45) Date of Patent: *Aug. 6, 2002

(54) METHOD AND APPARATUS FOR PROVIDING SERVO GAIN LINEARIZATION FOR A MAGNETO-RESISTIVE HEAD

(75) Inventors: Me Van Le, Milpitas; Thomas Huynh, San Jose, both of CA (US)

(73) Assignee: Samsung Electronics Co., Ltd (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/134,277

(22) Filed: Aug. 14, 1998

(51) Int. Cl.⁷ ............................................. G11B 5/584
(52) U.S. Cl. .................................................. 360/77.02
(58) Field of Search ............................. 360/77.08, 75, 360/77.03, 77.02, 53, 48

(56) References Cited

U.S. PATENT DOCUMENTS

| 4,371,902 A |   | 2/1983  | Baxter et al.              |
|-------------|---|---------|----------------------------|
| 4,539,662 A |   | 9/1985  | Hatano et al.              |
| 4,802,033 A |   | 1/1989  | Chi                        |
| 4,811,135 A | * | 3/1989  | Janz ................. 360/78.14 X |
| 4,823,212 A |   | 4/1989  | Knowles et al.             |
| 4,890,172 A |   | 12/1989 | Watt et al.                |
| 4,937,689 A |   | 6/1990  | Seaver et al.              |
| 4,977,472 A | * | 12/1990 | Volz et al. ............... 360/78.14 |
| 4,982,295 A |   | 1/1991  | Yakuwa et al.              |
| 5,036,408 A |   | 7/1991  | Leis et al.                |
| 5,050,146 A |   | 9/1991  | Richgels et al.            |
| 5,053,899 A |   | 10/1991 | Okawa et al.               |
| 5,182,684 A |   | 1/1993  | Thomas et al.              |
| 5,210,662 A |   | 5/1993  | Nishijima                  |
| 5,235,478 A |   | 8/1993  | Hoshimi et al.             |

(List continued on next page.)

FOREIGN PATENT DOCUMENTS

| EP | 0 601 855 A2 | 6/1994 |
| EP | 0 663 766 A1 | 7/1995 |
| EP | 0 717 559 A2 | 6/1996 |
| EP | 0 718 827 A2 | 6/1996 |
| GB | 2 285 165 A  | 6/1995 |
| GB | 2 307 089 A  | 5/1997 |
| GB | 2 308 488 A  | 6/1997 |
| WO | WO 95/24035  | 9/1995 |
| WO | WO 96/23305  | 8/1996 |

Primary Examiner—David Hudspeth
Assistant Examiner—Kin Wong
(74) Attorney, Agent, or Firm—Irell & Manella, LLP; Jeffrey P. Aiello

(57) ABSTRACT

A method and apparatus for generating servo information used in positioning the read head of a hard disk drive. The apparatus comprises a disk having a plurality of tracks, at least one of which has a data field which includes a plurality of servo bits, each of said servo bits being radially offset from an adjacent servo bit by a predetermined amount. In one embodiment, the predetermined amount is 5% of a width of the track. A servo signal based on the plurality of servo bits is generated and used to position the head relative to a track of the disk.

17 Claims, 13 Drawing Sheets

U.S. PATENT DOCUMENTS

| | | |
|---|---|---|
| 5,255,136 A | 10/1993 | Machado et al. |
| 5,291,110 A | 3/1994 | Andrews, Jr. et al. |
| 5,333,140 A | 7/1994 | Moraru et al. |
| 5,408,367 A | 4/1995 | Emo |
| 5,448,429 A | 9/1995 | Cribbs et al. |
| 5,450,249 A | 9/1995 | Nagaraj et al. |
| 5,452,285 A * | 9/1995 | Monen ................ 360/77.08 X |
| 5,453,887 A | 9/1995 | Negishi et al. |
| 5,465,034 A | 11/1995 | Andrews, Jr. et al. |
| 5,465,035 A | 11/1995 | Scaramuzzo, Jr. et al. |
| 5,500,776 A | 3/1996 | Smith |
| 5,523,902 A | 6/1996 | Pederson |
| 5,570,247 A | 10/1996 | Brown et al. |
| 5,581,420 A | 12/1996 | Chainer et al. |
| 5,587,850 A * | 12/1996 | Ton-that ................ 360/77.08 |
| 5,600,506 A | 2/1997 | Baum et al. |
| 5,606,469 A | 2/1997 | Kosugi et al. |
| 5,608,587 A | 3/1997 | Smith |
| 5,615,058 A | 3/1997 | Chainer et al. |
| 5,631,783 A | 5/1997 | Park |
| 5,640,423 A | 6/1997 | Archer |
| 5,657,179 A | 8/1997 | McKenzie |
| 5,659,436 A | 8/1997 | Yarmchuk et al. |
| 5,666,238 A | 9/1997 | Igari et al. |
| 5,680,270 A | 10/1997 | Nakamura |
| 5,680,451 A | 10/1997 | Betts et al. |
| 5,691,857 A | 11/1997 | Fitzpatrick et al. |
| 5,696,647 A | 12/1997 | Phan et al. |
| 5,710,677 A | 1/1998 | Teng et al. |
| 5,715,105 A | 2/1998 | Katayama et al. |
| 5,734,680 A | 3/1998 | Moore et al. |
| 5,748,677 A | 5/1998 | Kumar |
| 5,751,513 A | 5/1998 | Phan et al. |
| 5,760,992 A | 6/1998 | Phan et al. |
| 5,771,126 A | 6/1998 | Choi |
| 5,771,130 A | 6/1998 | Baker |
| 5,771,131 A | 6/1998 | Pirzadeh |
| 5,796,543 A | 8/1998 | Ton-That |
| 5,798,883 A | 8/1998 | Kim |
| 5,867,337 A | 2/1999 | Shimomura |
| 5,867,343 A * | 2/1999 | Le et al. ................ 360/77.08 |
| 5,867,353 A * | 2/1999 | Valent ................ 360/77.08 X |
| 5,892,634 A | 4/1999 | Ito et al. |
| 5,901,009 A | 5/1999 | Sri-Jayantha et al. |
| 5,917,670 A | 6/1999 | Scaramuzzo et al. |
| 5,946,157 A | 8/1999 | Codilian et al. |
| 6,031,684 A | 2/2000 | Gregg |
| 6,118,616 A | 9/2000 | Jeong |
| 6,178,060 B1 | 1/2001 | Liu |

* cited by examiner

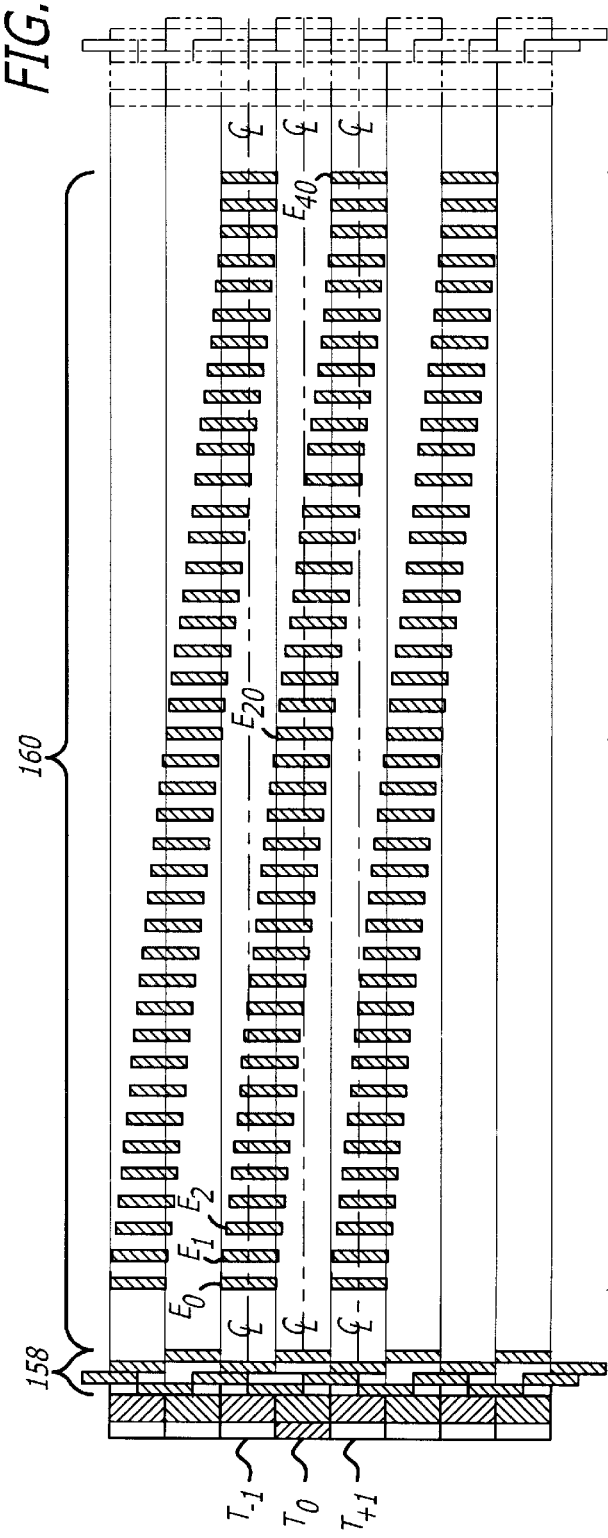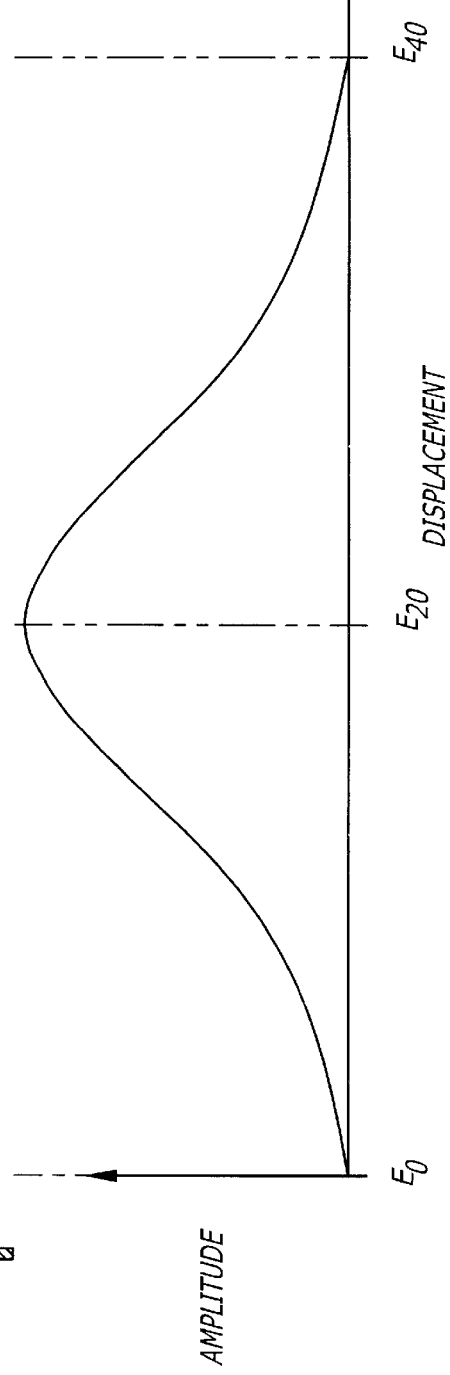

METHOD AND APPARATUS FOR PROVIDING SERVO GAIN LINEARIZATION FOR A MAGNETO-RESISTIVE HEAD

BACKGROUND OF THE INVENTION

1. Field of the Invention

The present invention relates in general to disk storage systems and more particularly, to a method and apparatus for generating servo information so as to provide gain linearization for positioning the read head of a hard disk drive.

2. Description of the Related Art

Disk drives are magnetic recording devices used for the storage of information. The information is recorded on concentric tracks on either surface of one or more magnetic recording disks. The disks are rotatably mounted to a spin motor and information is accessed by means of read/write heads that are mounted to actuator arms which are rotated by a voice coil motor. The voice coil motor is excited with a current to rotate the actuator and move the heads. The read/write heads must be accurately aligned with the storage tracks on the disk to ensure proper reading and writing of information.

To accurately write and read data, it is desirable to maintain the head on the center of the track. To assist in controlling the position of the head, each sector of the disk typically contains a number of servo bits accurately located relative to the centerline of the track. The raw signals produced by the servo bits are typically demodulated into a position signal which is utilized to determine the position of the head relative to the track, and to move the actuator arm if the head is not located on the track centerline.

Dual element transducers are being increasingly utilized in hard disk drives because they have greater aerial densities than single element transducers. Dual element transducers include a single write element and a separate read element which is constructed from a magneto-resistive material. Such dual element transducers are commonly referred to as magneto-resistive (MR) heads. These MR heads are typically narrow, in the order of half the width of a track.

FIG. 1A is a graph illustrating the variation of the servo burst signals A, B, C, D with respect to the position of the read head of a disk drive under near-ideal conditions. FIG. 1B is a graph illustrating the variation of the difference between servo burst signals (A–B) and (C–D) with respect to the position of the read head of a disk drive under near-ideal conditions. The variation of the servo burst signals A, B, C, D and the variation of the difference between servo burst signals (A–B) or (C–D) with respect to the position of the read head are two typical techniques used to provide correlational information between the amplitude of the position error signal and the distance between the head and the center of the track. In the first prior art technique, either of one servo burst signal, A, B, C, or D is used to provide correlational information. In the second prior art technique, two signals, (A–B) or (C–D), are used to provide correlational information. In both cases, the servo burst signals vary monotonically with the track position of the read head under near-ideal conditions.

Although such monotonic variation permits the servo system to correct the off-track position of the read head, the variation is nonlinear, especially in regions of the servo burst that are more than 25% off the center of the track. Thus, when the servo burst signals are read and demodulated into the position signal for moving the actuator arm, the position signal and thus, the movement of the actuator arm are also nonlinear. This ultimately results in nonlinear movement of the MR head.

Moreover, in most disk drives, the actual variation of the servo burst signals with respect to the track position for an MR head is non-monotonic and non-linear in nature and varies greatly between different heads. FIG. 2A is a graph illustrating the variation of the servo burst signals A, B, C, D with respect to the position of the read head of a disk drive under actual conditions. FIG. 2B is a graph illustrating the variation of the difference between servo burst signals (A–B) and (C–D) with respect to the position of the read head of a disk drive under actual conditions. This non-linearity is especially pronounced when the MR head is 25% off the center of the track because at that location, the values of the servo burst signals do not vary monotonically with respect to the position of the head.

U.S. Pat. No. 5,781,361 entitled "Method and Apparatus for Generating Servo Information" filed May 1, 1996 and assigned to the assignee of the present invention, describes a method and apparatus for providing servo information which varies monotonically with respect to the track position of the read head. The provision of such servo information permits accurate alignment of the read head.

However, there is a need in the technology for a method and apparatus for providing servo information which varies linearly with respect to the track position of an MR head. The provision of such servo information facilitates linearization of the servo loop gain, which improves the read throughput performance and consequently, increased product yields.

BRIEF SUMMARY OF THE INVENTION

A method and apparatus for generating servo information used in positioning the read head of a hard disk drive. The apparatus comprises a disk having a plurality of tracks, at least one of which has a data field which includes a plurality of servo bits, each of said servo bits being radially offset from an adjacent servo bit by a predetermined amount. In one embodiment, the predetermined amount is 5% of a width of the track. A servo signal based on the plurality of servo bits is generated and used to position the head relative to a track of the disk.

BRIEF DESCRIPTION OF THE DRAWINGS

FIG. 7A illustrates the layout of a sector of a plurality of calibration tracks showing the E burst which comprises servo bits $E_0$–$E_{40}$, provided in accordance with the principles of the present invention.

FIG. 7B illustrates one embodiment of the E burst profile as provided by reading the servo bits $E_0$–$E_{40}$ of FIG. 7A, in accordance with the principles of the present invention.

DETAILED DESCRIPTION OF THE INVENTION

The present invention utilizes information obtained from a plurality of servo bits $E_0$–$E_{40}$ to provide linear position information for aligning the head 110 instead of using only two servo signals, (A–B) or (C–D), as used in conventional techniques. The servo bits $E_0$–$E_{40}$ are used in conjunction with a linearization technique to provide linear position information.

Figure 1A:
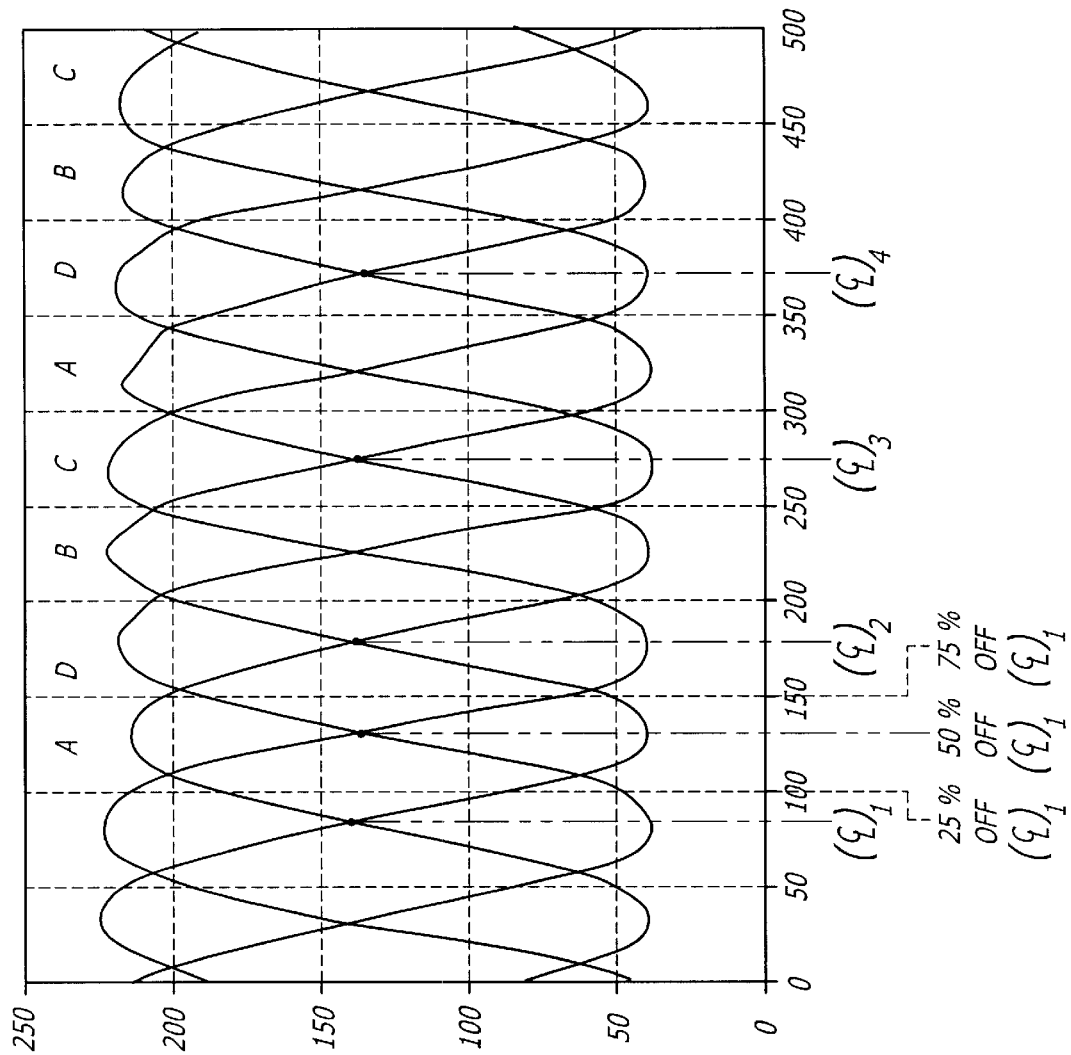
FIG. 1A is a graph illustrating the variation of the servo burst signals A, B, C, D with respect to the position of the read head of a disk drive under near-ideal conditions, as used in the prior art.
Figure 1B:
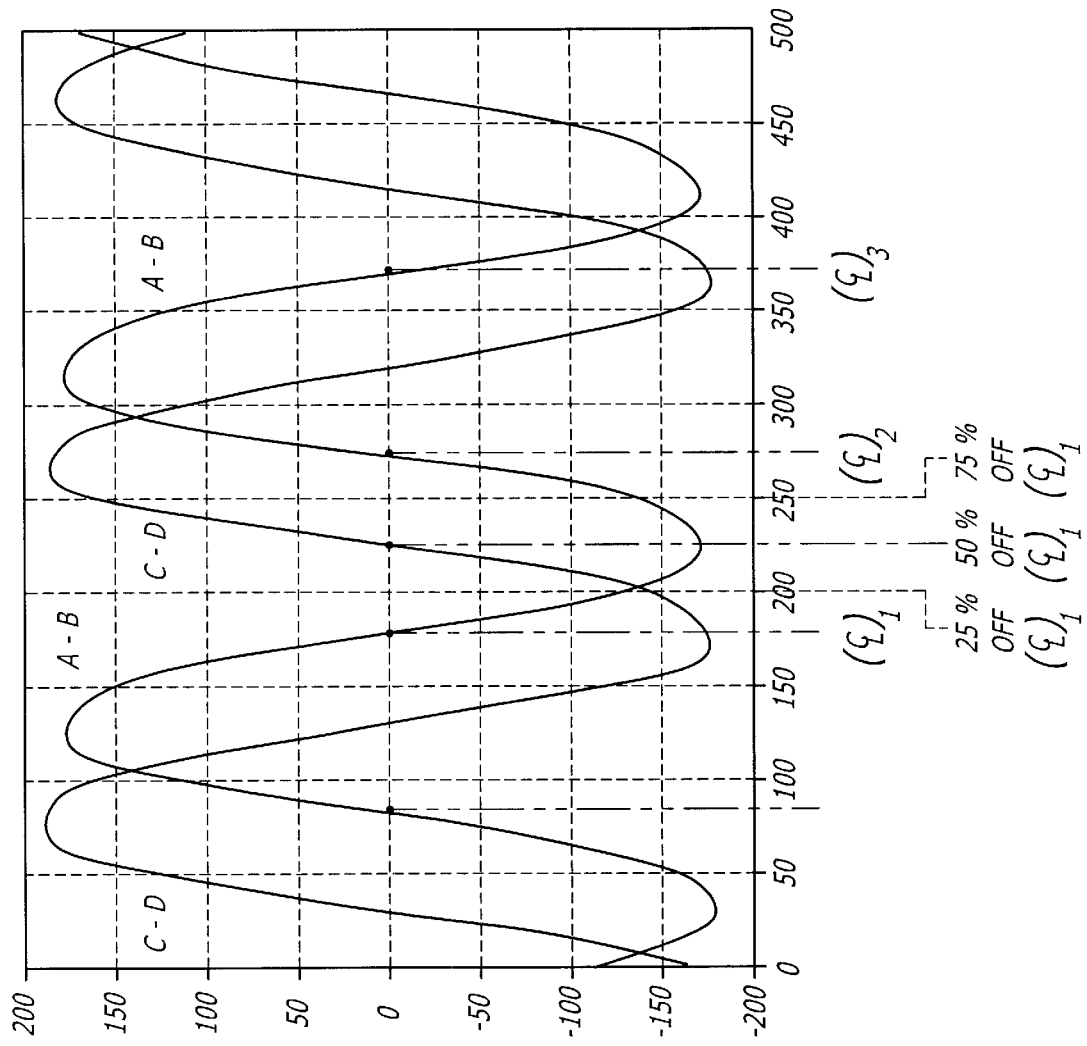
FIG. 1B is a graph illustrating the variation of the difference between servo burst signals (A–B) and (C–D) with respect to the position of the read head of a disk drive under near-ideal conditions, as used in the prior art.
Figure 2A:
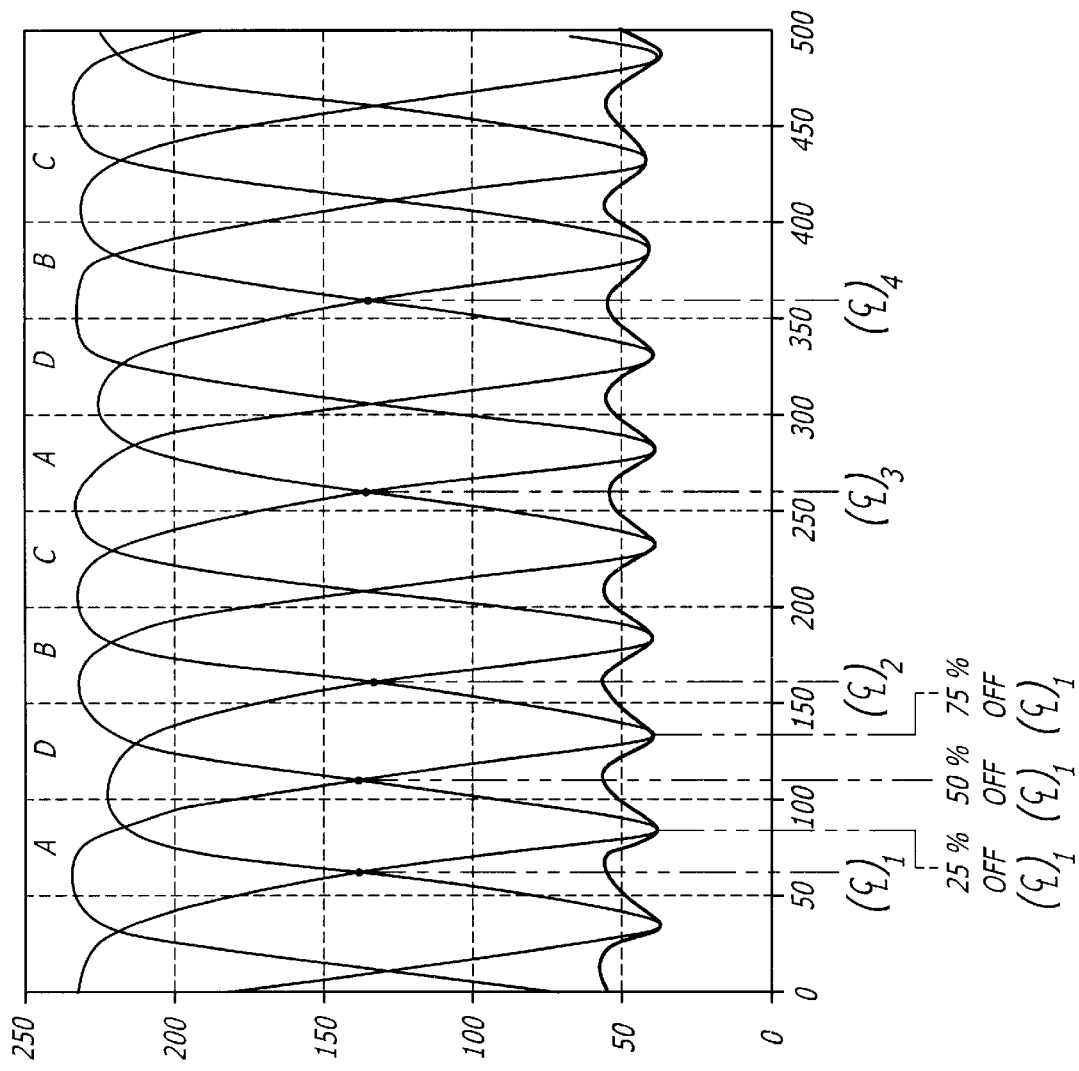
FIG. 2A is a graph illustrating the variation of the servo burst signals A, B, C, D with respect to the position of the position of the read head of a disk drive under non-ideal conditions, as used in the prior art.
Figure 2B:
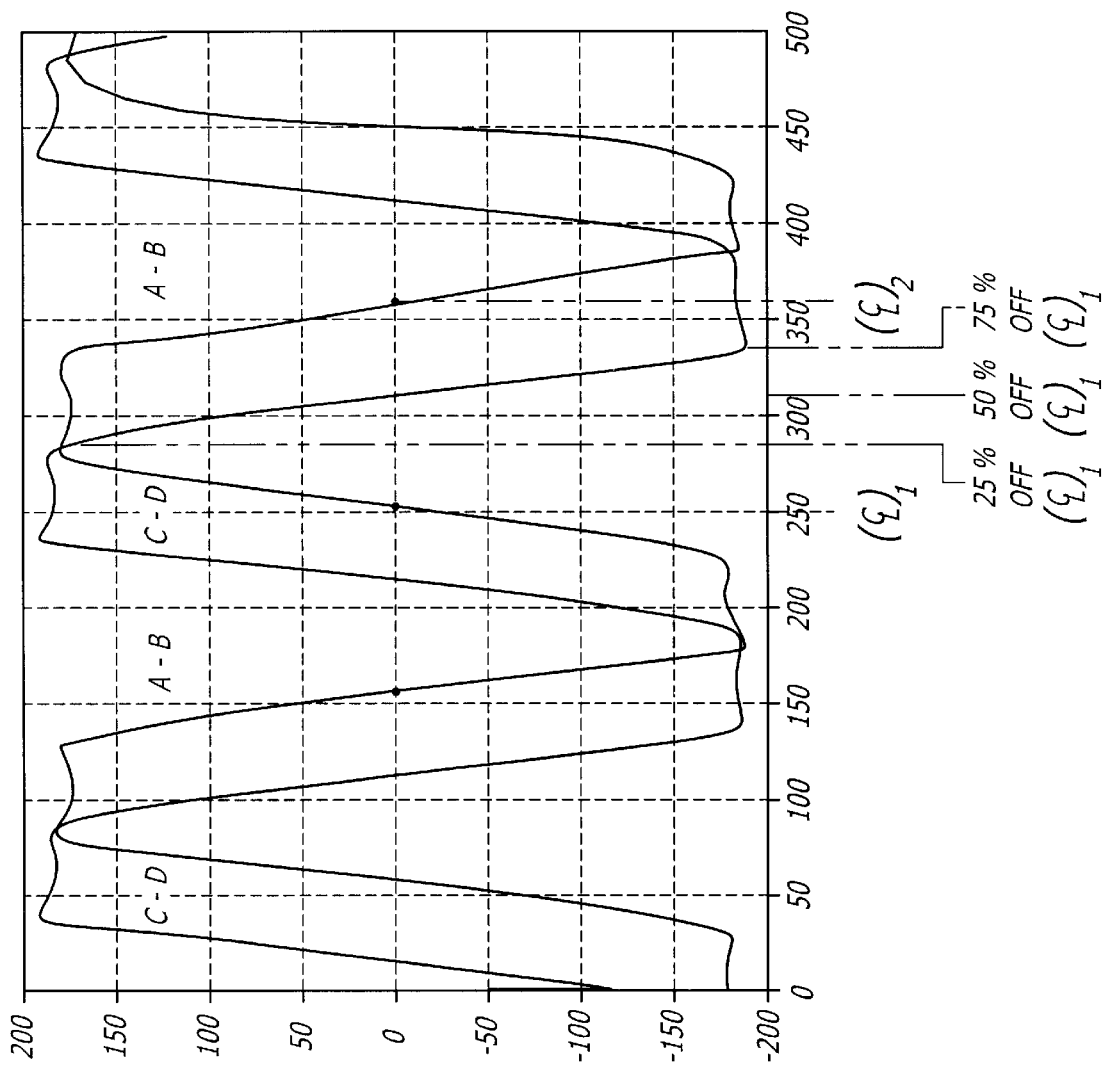
FIG. 2B is a graph illustrating the variation of the difference between servo burst signals (A–B) and (C–D) with respect to the position of the read head of a disk drive under non-ideal conditions, as used in the prior art.
Figure 3A:
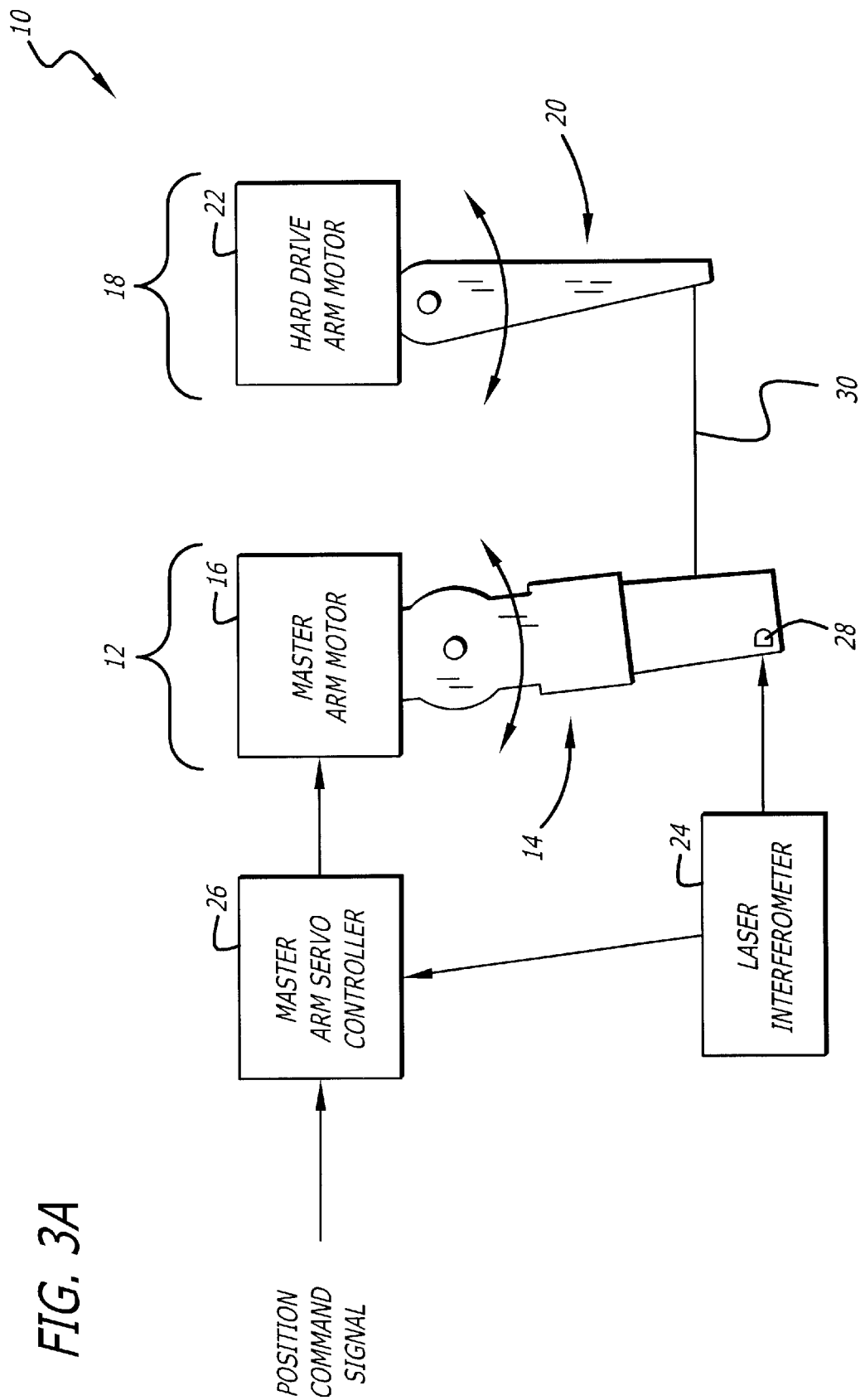
FIG. 3A illustrates a servo writing system which implements the method of the present invention.

Referring to the drawings more particularly by reference numbers, FIG. 3A illustrates a servo writing system 10 which implements the servo writing process of the present invention. The servo writing system 10 directs the servo writing process by positioning the read/write heads in a magnetic disk drive from a master arm and motor. The servo writing system 10 includes a master drive assembly 12 which includes a master arm 14 that has a master voice coil motor 16. The servo writing system 10 also comprises a hard drive assembly 18 which includes a hard drive arm 20 that has a hard drive voice coil motor 22.

To ensure that the master arm 14 is accurately positioned, a laser interferometer 24 is used to measure the position of the master arm 14. This information is relayed to a master arm servo controller 26, which moves the master arm 14 to the desired track of the data storage disk in which data is to be recorded. The laser interferometer 24 detects the position of the master arm 14 by monitoring light reflected off a reflector 26 mounted on the master arm 14. This information is relayed to the master arm servo controller 26, which also receives a position command signal from an external source, such as a computer, which is programmed to coordinate servo writing.

Figure 3B:
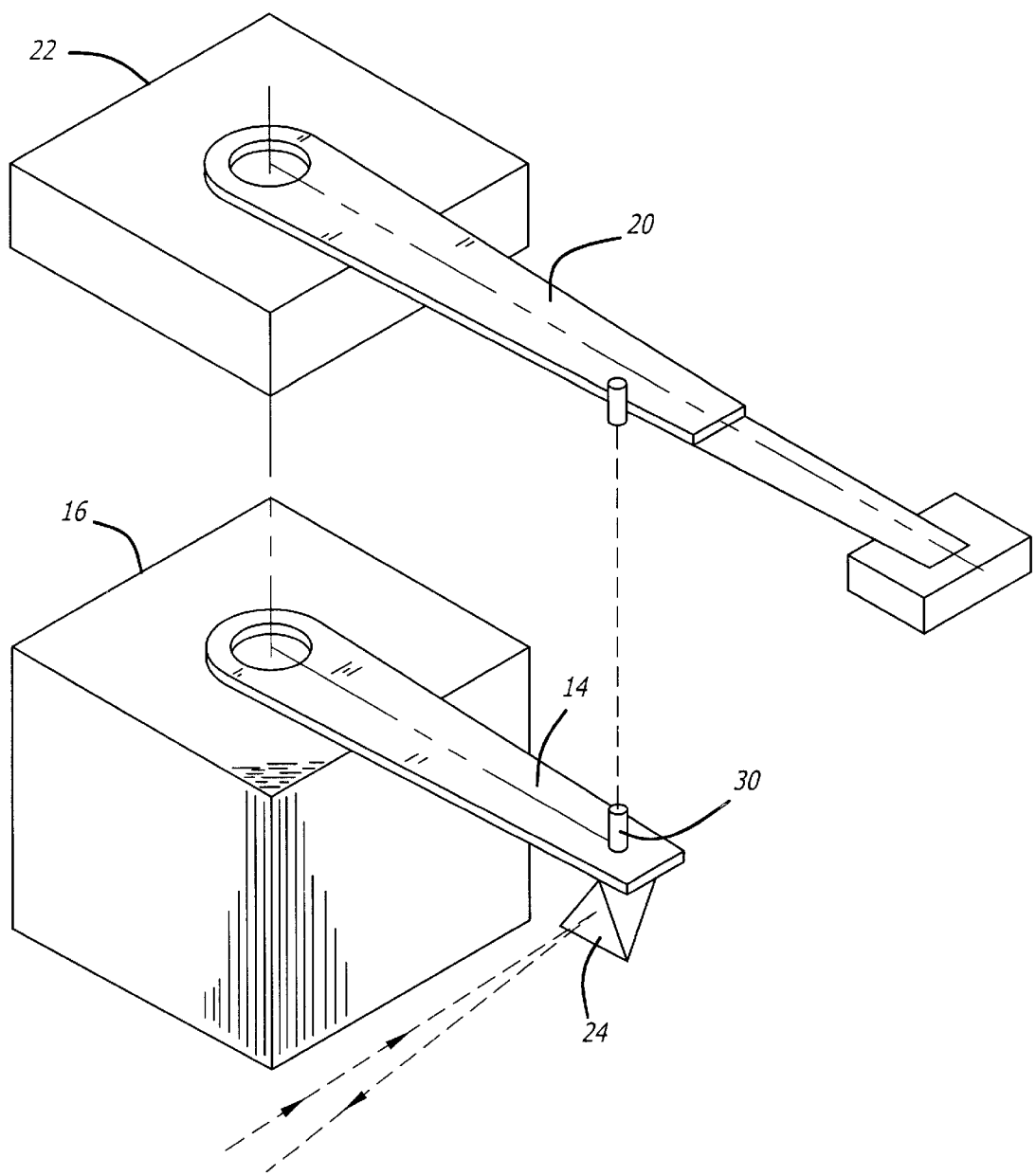
FIG. 3B is a perspective view of a portion of the servo-writing system of FIG. 3A.

A mechanical link between the master arm 14 and the hard drive arm 18 is established with the use of a mechanical push-pin 30, as shown in FIGS. 3A and 3B. The mechanical push-pin 30 is attached at one end to the master arm 14 and extends into the hard drive through an access slot. The hard drive arm 20 is biased by its motor to press against the side of the push pin and follow the master arm 14. This mechanical positioning system enables the hard drive arm 20 to track movement of the master arm 14, and thus assure writing of servo information at the proper radius of the hard drive assembly 18.

The servo writing system 10 directs the servo writing process by positioning the read/write heads in a magnetic disk drive from a master arm and motor. In particular, a position command signal from an external source, such as a computer, directs the master arm 14 to position the read/write heads in the hard drive arm 20 to write a plurality of servo bursts in the data field of a calibration track on one or more disks of the hard drive assembly 18. The plurality of servo bursts will later be used in providing position signal information for the hard disk drive 18 in accordance with the principles of the present invention.

Figure 4:
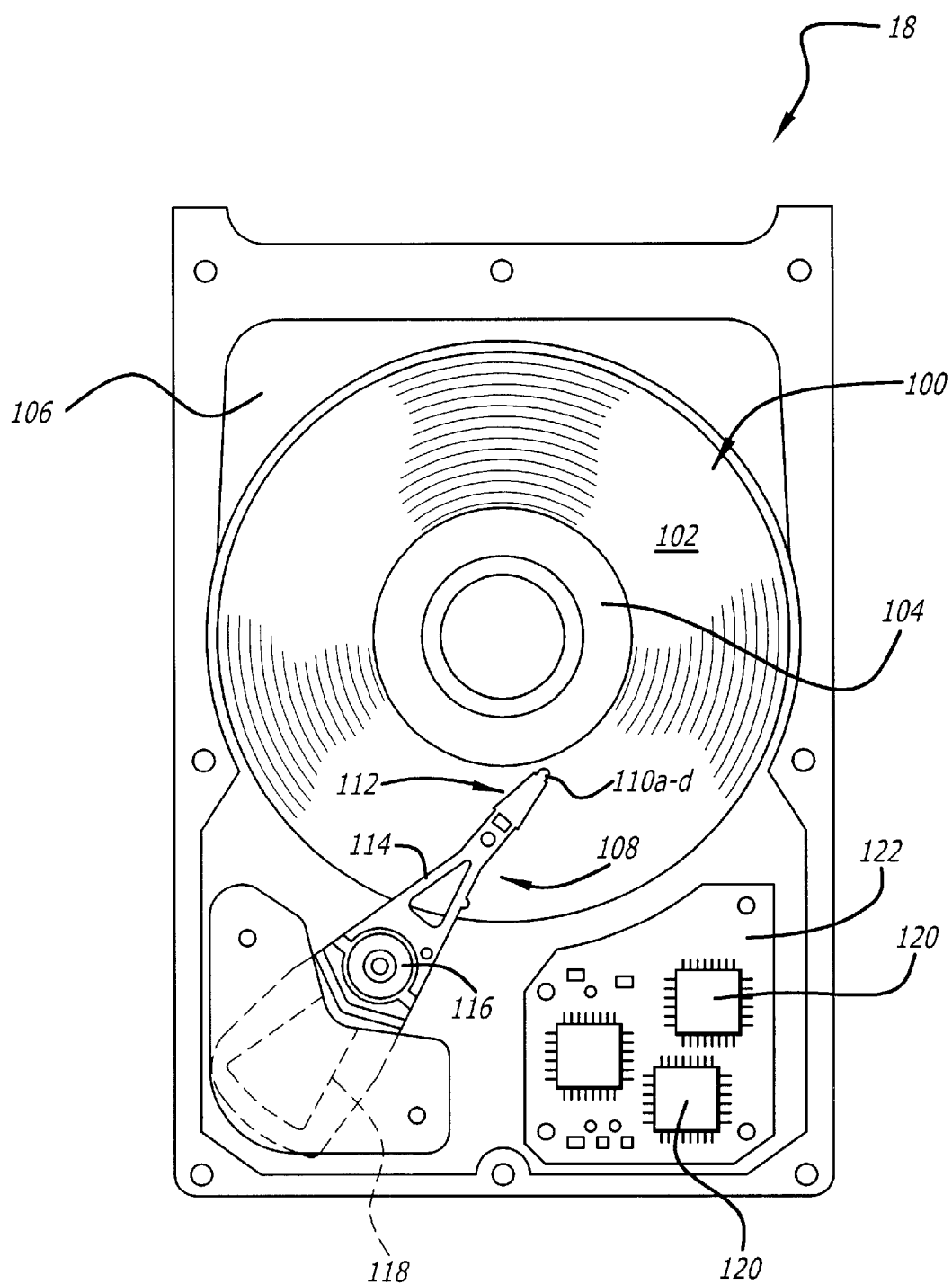
FIG. 4 illustrates a hard disk drive which utilizes the method of the present invention.

FIG. 4 shows the hard disk drive 18 of FIG. 3A. The disk drive 18 includes a disk pack 100 with a plurality of disks 102 that are collectively rotated by a spin motor 104. The spin motor 104 corresponds to the hard drive arm motor 22 in FIG. 3A. The spin motor 104 is mounted to a base plate 106. Also mounted to the base plate 106 is an actuator arm assembly 108. The actuator arm assembly 108 corresponds to the hard drive arm 20 in FIG. 3A. The actuator arm assembly 108 includes a number of read/write (R/W) heads 110a–d mounted to corresponding flexure arms 112. The flexure arms 112 are attached to an actuator arm 114 that can rotate about a bearing assembly 116. The assembly 108 also contains a voice coil motor 118 which moves the heads 110a–d collectively relative to the disks 102. There is typically a single head for each disk surface. The spin motor 104, voice coil 118 and the heads 110 are coupled to a number of electronic circuits 120 mounted to a printed circuit board 122. In the following discussion, only one head 110 is referenced. The electronic circuits 120 typically include a read channel circuit, a microprocessor-based controller and a random access memory (RAM) device.

Figure 5:
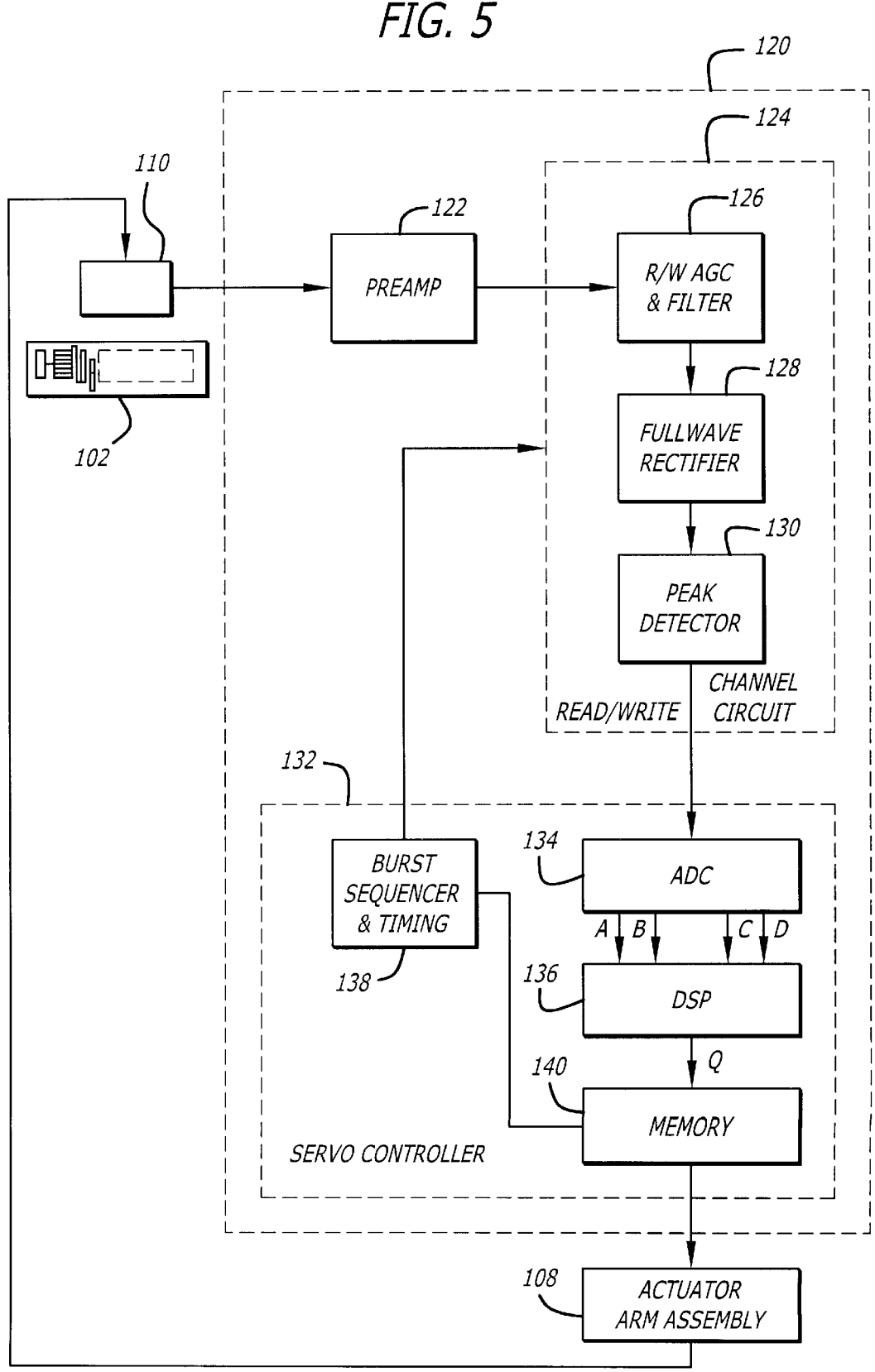
FIG. 5 is a block diagram of portions of an integrated circuit read channel in accordance with the present invention.

FIG. 5 is a block diagram of an electronic circuit 120 of the drive. The electronic circuit 120 includes a preamplifier 122 which is coupled to a read/write (R/W) channel circuit 124. The R/W channel circuit 124 includes a RIW Automatic Gain Control (AGC), a filter circuit 126, a fullwave rectifier 128 and a peak detector 130. The electronic circuit 120 further comprises a microprocessor-based servo controller 132 which includes an analog-to-digital converter (ADC) 134, a digital signal processor (DSP) 136, a burst sequencer and timing circuit 138 and a memory 140, such as a random access memory (RAM) device.

The electronic circuit 120 is coupled to one of the magnetic heads 110 which senses the magnetic field of a magnetic disk 102. When reading the servo information located in the servo field region 10 on the disk 102, the head 110 generates a read signal that corresponds to the magnetic field of the disk 102. The read signal is first amplified by the preamplifier 122, and then provided to the R/W channel circuit 124. The AGC data included in the read signal is provided to the R/W AGC and filter circuit 126. The R/W AGC circuit in circuit 126 monitors the AGC data provided by the read signal and the read signal is then filtered by the filter circuit located in the R/W AGC and filter circuit 126. The fullwave rectifier 128 rectifies the read signal and provides the rectified read signal to the peak detector 130. The peak detector 130 detects the amplitude of the read signal. The read signal is then provided to the ADC 134 which provides digitized samples of the analog read signal. The digitized signal is then provided to a digital signal processor (DSP) 136 which first reconstructs a portion of the E burst profile. Upon reading all 41 E servo bits $E_0$–$E_{40}$, the entire E burst profile may be reconstructed. Based on the reconstructed E burst profile, the DSP 136 reconstructs the four servo bursts A, B, C and D. The DSP then determines the non-linear characteristics of the track profile and implements a linearization technique to generate a position offset signal Q which is stored in memory 140 and subsequently provided to the actuator arm assembly 108 to move the heads 110.

Figure 6:
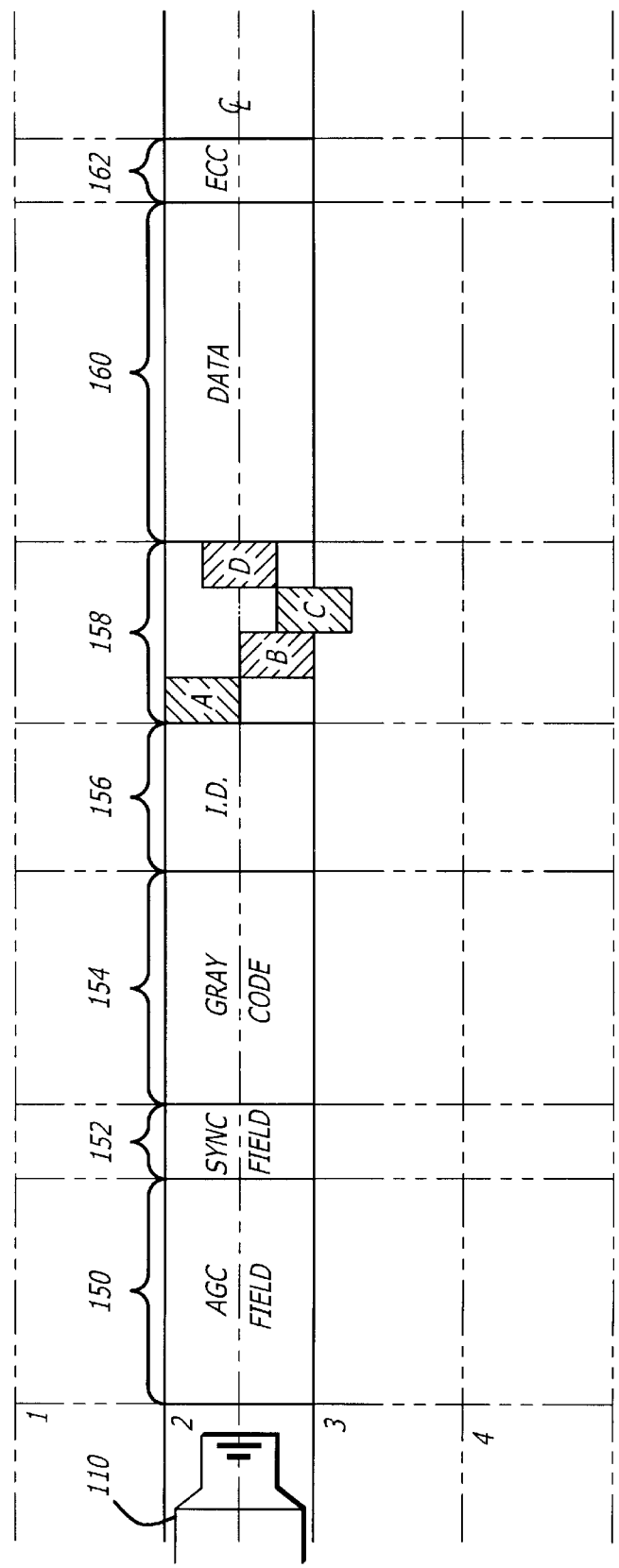
FIG. 6 illustrates the layout of a typical sector of the disk 102.

FIG. 6 illustrates the layout of a typical sector in accordance with the principles of the present invention. As shown, data is stored within sectors of radially concentric tracks located across the disk 102. A typical sector will have an automatic gain control (AGC) field 150, a synchronization (sync) field 152, a gray code field 154 that identifies the track, an identification (ID) field 156 that defines the sector, a servo field 158 which includes a number of servo bits A, B, C, D, a data field 160 which contains the data and an error correction code field 162.

The present invention provides a plurality of servo bits $E_0$–$E_{40}$, which are written in each data field 160 of a calibration track of the disk 102, as shown in FIG. 7A. In one embodiment, the servo bits $E_0$–$E_{40}$ may be written across a set of two calibration tracks. In another embodiment, a set of the servo bits $E_0$–$E_{40}$ may be written across three sets of calibration tracks. Such an arrangement facilitates greater accuracy in providing servo information. The servo bits $E_0$–$E_{40}$ are written on the disk 102 by read/write head 110 under the control of the master arm 14 (FIG. 3A). Each of the servo bits $E_0$–$E_{40}$ will be referred to as an E bit. In particular, the master arm 14 first positions the hard drive arm 20 to a calibration track $T_{-1}$ that is adjacent to a primary calibration track $T_0$. A first calibration burst $E_0$ is written in the data field 160 of the calibration track $T_{-1}$ at the center of the track $T_{-1}$. In one embodiment, the calibration burst $E_0$ is identical in amplitude and phase to the D servo burst. The master arm 14 then moves the hard drive arm 20 to a second position that is offset radially from $E_0$ (in the direction towards $T_0$) by 5% of the width of the calibration track $T_0$. The read/write head 110 is then directed to write the servo burst $E_1$ at this second position. In a preferred embodiment, $E_1$ is written at a 1 microsecond delay from $E_0$. This process is repeated for $E_2$ through $E_{40}$, for a total of 41 E bursts. As shown in FIG. 7A, the servo bits $E_0$–$E_{40}$ will span over a region covering three calibration tracks, $T_{-1}$, $T_0$ and $T_{+1}$. The process of writing the E servo bits is repeated for all data fields 160 on the calibration tracks $T_{-1}$, $T_0$ and $T_{+1}$. In addition, the process for writing the E servo bits may be applied to all read/write heads 110a–d on all sides of the disks 102 of the disk pack 100. Burst trimming, as is known in the art, may also be applied to the E servo bits.

In an alternate embodiment, two sets of the servo bits $E_0$–$E_{40}$ will be written over two sets of three calibration tracks as shown in FIG. 7A. However, it is apparent to one skilled in the art that a greater number of sets of servo bits $E_0$–$E_{40}$ may be utilized over a greater number of calibration tracks. It is also apparent to one skilled in the art that fewer or a greater number of E servo bits may be utilized in generating a position offset signal. After the servo writing process has been completed by the servo writing system 10, the hard disk drive 18 is removed from the system 10. The hard disk drive 18 is then ready for reading and writing of data.

Figure 8:
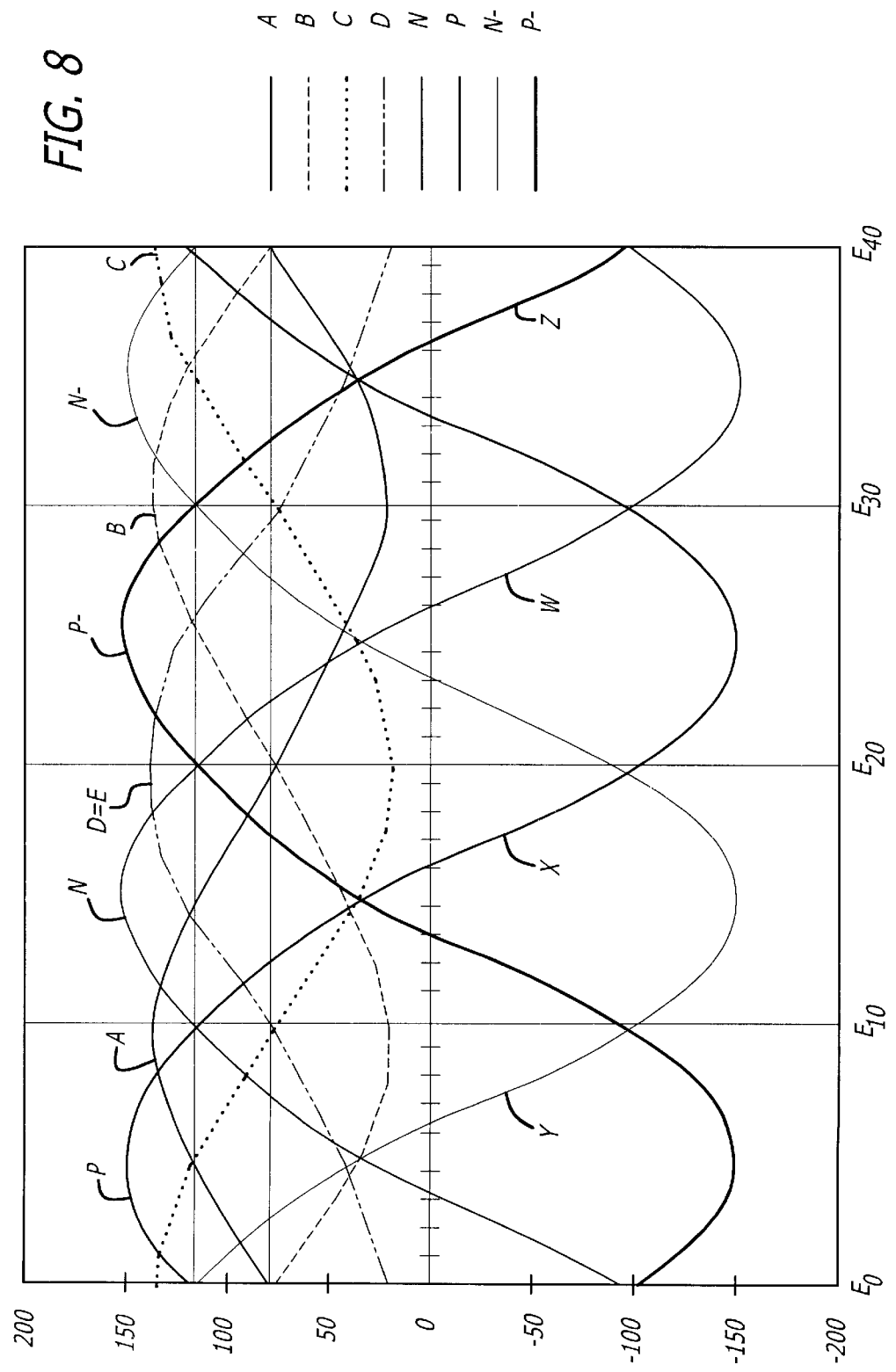
FIG. 8 illustrates a plurality of servo burst signals (A, B, C, D), a plurality of position signals (N. P, N–, P–) and a plurality of servo position signals (Y, X, W and Z) that are generated based on the E burst profile of FIG. 7B.

To read the written servo bits $E_0$–$E_{40}$, the head 110 is first moved to the calibration track(s), which may be in the outer or inner diameter of the disk 102. The head 110 is first directed to read the A and B (or the C and D) servo bursts so as to align itself with the center of the calibration track. The head 110 is next directed to read the servo information provided by each of the E bursts, i.e., $E_0$–$E_{40}$, while remaining over the centerline of the calibration track. The servo information read is provided to the DSP 136, which reconstructs the E burst profile as shown in FIG. 7B, based on the servo bits $E_0$–$E_{40}$ that were read. The electronic circuits 120 then utilize the E burst profile to reconstruct all four servo bursts A, B, C and D by adjusting the phase offset of each burst A, B, C or D with respect to the E burst profile. FIG. 8 illustrates the reconstructed servo bursts A, B, C and D.

The information obtained from all four servo bursts A, B, C and D is then utilized, together with a linearization technique, to provide improved linear position information for aligning the head 110. This linearization process is provided as follows.

First, four servo signals, namely, N, P, N– and P–, based on the A, B, C and D bursts are generated, where:

$$N=(A-B)-(C-D);$$

$$P=(A-B)+(C-D);$$

$$N-=-(A-B)+(C-D);$$

and $$P-=-(A-B)-(C-D).$$

Based on the four position signals N, P, N– and P–, a set of four position signals, namely, W, X, Y and Z are generated, where W, X, Y and Z are the linear portions of the functions N, P, N– and P– respectively, where the slopes of the functions are positive. As shown in Table A, the data points which make up the W, X, Y and Z position signals may be calculated from the various E servo bits.

Figure 9:
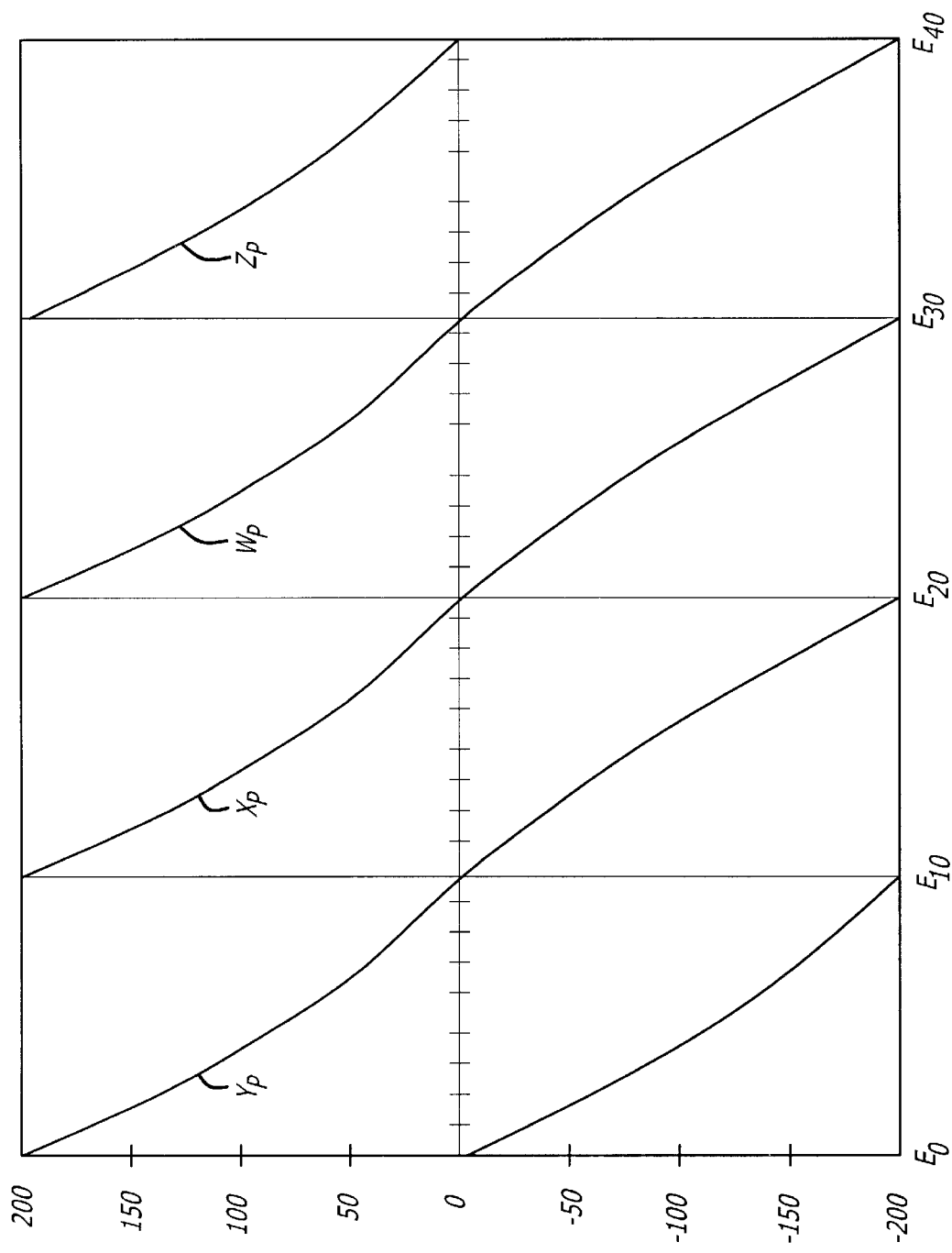
FIG. 9 illustrates a plurality of composite position signals ($Y_p$, $X_p$, $W_p$ and $Z_p$) that is generated based on the plurality of servo position signals (Y, X, W and Z).

A set of four composite position signals $W_p$, $X_p$, $Y_p$ and $Z_p$ based on the position signals W, X, Y and Z are then generated. In one embodiment, the position signal $W_p$ results from duplicating the signal W and then shifting and aligning the original signal W and the duplicated signal $W_{duplicate}$ to provide the signal $W_p$ as shown in FIG. 9. The other signals $X_p$, $Y_p$ and $Z_p$ are similarly obtained. Next, a reference slope for the function representing each position signal is obtained. This is accomplished by obtaining the line segment represented by the two end data points of each function. The slope of each line segment corresponding to W, X, Y and Z is referred to as $m_w$, $m_x$, $m_y$, and $m_z$ respectively.

Each function is then linearized using its corresponding slope value. For example, $$W = m_w(E_0, E_1, \ldots, E_{40});$$

$$X = m_x(E_0, E_1, \ldots, E_{40});$$

$$Y = m_y(E_0, E_1, \ldots, E_{40});$$

and $$Z = m_z(E_0, E_1, \ldots, E_{40}).$$

The slope a and constant b of each linear segment between two consecutive data points for each of the W, X, Y and Z position signals are then calculated and stored in memory. For example, in the following table, the slope $a_{y0}$ and constant $b_{y0}$ for the line segment formed by data points Y0 & Y1, are obtained.

| SLOPE | CONSTANT | DATA POINTS | POSITION SIGNAL |
|---|---|---|---|
| $a_{y0}$, $a_{y1}, \ldots, a_{y9}$ | $b_{y0}$, $b_{y1}, \ldots, b_{y9}$ | Y0 & Y1, ..., Y9 & Y10 | $Y_p$ |
| $a_{x0}$, $a_{x1}, \ldots, a_{x9}$ | $b_{x0}$, $b_{x1}, \ldots, b_{x9}$ | X0 & X1, ..., X9 & X10 | $X_p$ |
| $a_{w0}$, $a_{w1}, \ldots, a_{w9}$ | $b_{w0}$, $b_{w1}, \ldots, b_{w9}$ | W0 & W1, ..., W9 & W10 | $W_p$ |
| $a_{z0}$, $az_{y1}, \ldots, a_{z9}$ | $b_{z0}$, $bz_{y1}, \ldots, b_{z9}$ | Z0 & Z1, ..., Z9 & Z10 | $Z_p$ |

Figure 10:
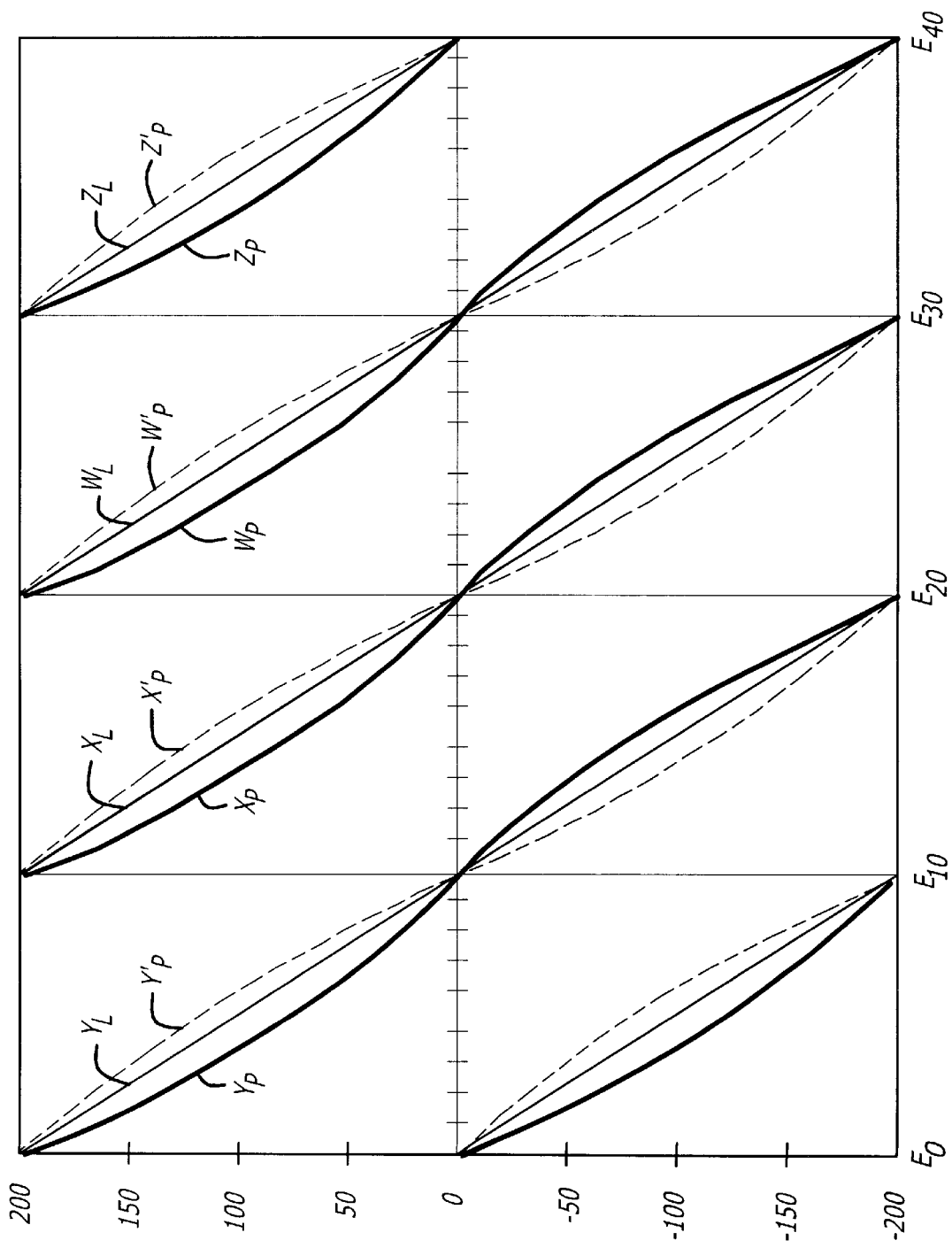
FIG. 10 illustrates a linear position signal that is generated based on the composite servo position signals.

Based on the above calculations, the data points for an ideal, linear position signal function $Y_L$ are calculated. This is accomplished by calculating an offset signal $Y_p'$, which when added to Y will provide the ideal position signal $Y_L$ as shown in FIG. 10. For example, if $Y_L$ is constructed from the data points $Y_1, \ldots Y_{10}$, then $$Y_L = f(Y_1, Y_2, \ldots Y_{10})$$

$$Y_1 = f(Y1, m_{y1}, a_{y1}, b_{y1})$$

$$Y_{10} = f(Y10, m_{y2}, a_{y2}, b_{y2})$$

The linear position signal functions $X_L$, $W_L$ and $Z_L$ may be similarly obtained. As a result, an ideal position signal may be provided based on the E servo bits, $E_0$ to $E_{40}$.

Through utilization of the apparatus and method of the present invention, servo information which varies linearly with respect to the track position of an MR head is provided. The provision of such servo information facilitates linearization of the servo loop gain, which improves the read throughput performance and consequently, increased product yields.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A disk for a hard disk drive, comprising:
   a disk having a plurality of tracks, each of said tracks having a servo field with a plurality of servo field bits, one set of said tracks having a data field with a plurality of servo bits, said servo bits being separate from said servo field bits, each of said servo bits being radially offset from an adjacent servo bit by a predetermined amount, each track having a centerline, a first outer edge and a second outer edge, said servo bits including a sequence of servo bits wherein a first servo bit of the sequence has a lower edge at the first outer edge of said track and a last servo bit of the sequence has an upper edge at the second outer edge of said track.

2. The disk as recited in claim 1, wherein the servo field bits include an A bit, a B bit, a C bit and a D bit, where the A bit and the B bit have a common boundary located at the track centerline and where the C bit and D bit have a common boundary.

3. The disk as recited in claim 1, wherein said predetermined amount is 5% of a width of said track.

4. The disk as recited in claim 1, wherein said plurality of servo bits provide a servo burst amplitude profile.

5. The disk as recited in claim 4, wherein said servo burst amplitude profile provides a position signal.

6. The disk of claim 1, wherein said plurality of servo bits are used in conjunction with a linearization technique to provide linear position information.

7. A hard disk drive, comprising:
   a housing;
   an actuator arm mounted to said housing;
   a head mounted to said actuator arm;
   a spin motor mounted to said housing; and
   a disk attached to said spin motor, said disk having a plurality of tracks, each of said tracks having a servo field with a plurality of servo field bits, one set of said tracks having a data field with a plurality of servo bits, said servo bits being separate from said servo field bits, each of said servo bits being radially offset from an adjacent servo bit by a predetermined amount, each track having a centerline, a first outer edge and a second outer edge, said servo bits including a sequence of servo bits wherein a first servo bit of the sequence has a lower edge at the first outer edge of said track and a last servo bit of the sequence has an upper edge at the second outer edge of said track; and
   a servo controller coupled to said head for controlling reading of the servo bits, said servo bits being used with an ideal linear position function generated from the sequence of servo bits, for positioning said head.

8. The hard disk drive as recited in claim 7, wherein the servo field bits include an A bit, a B bit, a C bit and a D bit, where the A bit and the B bit have a common boundary located at the track centerline and where the C bit and D bit have a common boundary.

9. The hard disk drive of claim 8, wherein said servo field bits are used to position the head to read said servo bits.

10. The hard disk drive as recited in claim 7, wherein said predetermined amount is 5% of a width of said track.

11. The hard disk drive as recited in claim 7, wherein said plurality of servo bits provide a servo burst amplitude profile.

12. The hard disk drive as recited in claim 11, wherein said servo burst amplitude profile provides the position signal.

13. A method of controlling a head mounted on a hard disk drive arm comprising the steps of:

(a) providing a disk attached to a hard disk drive assembly, said disk having a plurality of tracks, each of said tracks having a servo field with a plurality of servo field bits, one set of said tracks having a data field with a plurality of servo bits, said servo bits being separate from said servo field bits, each of said servo bits being radially offset from an adjacent servo bit by a predetermined amount, each track having a centerline, a first outer edge and a second outer edge, said servo bits including a sequence of servo bits wherein a first servo bit of the sequence has a lower edge at the first outer edge of said track and a last servo bit of the sequence has an upper edge at the second outer edge of said track;

(b) reading the plurality of servo bits;

(c) generating a servo signal based on said plurality of servo bits; and (d) positioning the hard disk drive arm in accordance with the servo signal and an ideal linear position generated from the sequence of servo bits.

14. The method as recited in claim 13, wherein in step (a), said set of tracks includes a track having a track centerline, and wherein in step (b), said plurality of servo bits are read while said head is positioned along said track centerline.

15. The method as recited in claim 13, wherein in step (a), said predetermined amount is 5% of a width of said track.

16. The method as recited in claim 13, wherein step (c) comprises the steps of:

(c.1) generating a servo signal based on said plurality of servo bits; and (c.2) storing said servo signal in memory.

17. The method as recited in claim 13, wherein step (b) comprises:

(b.1) reading said servo field bits to position a head on a track centerline of one of said set of tracks; and (b.2) reading the plurality of servo bits.

\* \* \* \* \*